Aug. 22, 1961     L. R. MOSKOWITZ ET AL     2,997,158
VIBRATORY BULK FEEDER

Filed March 18, 1957     4 Sheets-Sheet 1

INVENTORS
LESTER R. MOSKOWITZ
ROBERT R. PETERSON
BY
*Charles L. Lovercheck*
ATTORNEY INVENTORS
LESTER R. MOSKOWITZ
ROBERT R. PETERSON
BY Charles L. Lovercheck
ATTORNEY Aug. 22, 1961  L. R. MOSKOWITZ ET AL  2,997,158
VIBRATORY BULK FEEDER Filed March 18, 1957  4 Sheets-Sheet 3

INVENTORS
LESTER R. MOSKOWITZ
ROBERT R. PETERSON
BY *Charles L. Lovercheck*

ATTORNEY

INVENTORS
LESTER R. MOSKOWITZ
ROBERT R. PETERSON
BY Charles L. Lovercheck
ATTORNEY

United States Patent Office 2,997,158
Patented Aug. 22, 1961

2,997,158
VIBRATORY BULK FEEDER
Lester R. Moskowitz and Robert R. Peterson, Erie, Pa., assignors to Eriez Manufacturing Co., Erie, Pa., a corporation of Pennsylvania
Filed Mar. 18, 1957, Ser. No. 646,858
10 Claims. (Cl. 198—220)

This invention relates to the general class of vibratory apparatus and, more particularly, to vibratory feeders, conveyors, screens, bin vibrators, etc.

All such vibratory apparatus consists in essence of a mass to be vibrated, a resilient means for supporting such mass, a means of producing an exciting or driving force, and a supporting meansf or these elements. The resilient means is generally, but not necessarily, selected so that when considered with the mass to be vibrated, these elements have a natural frequency approximately equal to the exciting frequency. Depending upon various factors, the natural frequency of the mass spring system may be chosen to be above, below, or equal to the exciting frequency.

This invention is in no way limited to the specific configurations disclosed herein but contemplates the basic combination of a mass to be vibrated and a resilient element consisting of two disk shaped members attached to the element to be vibrated with the outer edges of the disk shaped members attached to a massive support member. The exciter is so disposed as to exert force on the element to be vibrated, such force being opposed by the spring element and the reaction force which is developed being applied to the support element. The exciter used is a magnetic type but this invention is in no way limited to this type of exciter. The disk shaped spring elements may be constructed of steel, plastic, etc. or any material with suitable mechanical properties. For example, the plastic may be plastic material sold under the trademark "Scotch Ply" which is an oriented filament fiber glass epoxy laminate.

Further, increased spring force and damping may be obtained by fluid enclosed around the disk. This factor can be utilized to produce linear or non-linear spring forces or damping forces. Also among the advantages of the invention disclosed herein is the inherent high degree of damping in the spring system itself without the use of elastomers, rubber, or inner spring frictional means which are important and often essential in conventional vibratory systems operated near the natural frequency.

In conventional vibratory systems, the device is seldom, if ever, designed so that the natural frequency of the system and the exciter frequency coincide, even though maximum efficiency occurs with this condition, since, with this condition, amplification ratio is very high. Destructively large uncontrollable vibration occurs at or very near the natural frequency and unless sufficient damping is provided, any change in loading will have a material effect on the characteristics of the machine. For this reason, the conventional system is usually designed so that its natural frequency is above or below the exciter frequency. In some cases, a material with a high internal degree of damping (frictional energy loss) has been used as a spring member or is introduced with the spring member so that the device may be constructed with the natural frequency closer to or at the exciter frequency without occurrence of the destructively large uncontrollable vibration.

In some conventional systems, the spring member is made up of multiple leaves immediately adjacent each other and some damping is produced by friction between the leaves of the spring. None of these systems are truly satisfactory since the use of estomer or rubber is costly and highly limited by its sensitivity to temperature. Therefore, consistency from one to another is difficult to maintain. In the case of multi-leaf springs having their leaves abutting, local stresses are set up in the springs which greatly reduce spring life and produce operational inconsistencies. It should also be noted that in all of the conventional systems, the resilient material is always stressed in pure shear or in simple bending, depending upon the system used.

In the system disclosed herein, the disk type spring members incorporate a high degree of damping in themselves as a result of the unique deflection characteristics of the disk springs. The spring member is not only stressed in simple bending but, in addition, the material is put in tension and compression. The internal damping of any material in tension or compression is many times greater than the damping of the same material in bending and the result is a system with high damping and extreme simplicity.

In conventional systems using estomers, rubber, leaf springs, or coil spring members, the cost of these members represents a significant item in the total cost of the vibratory system. This is especially true in the most commonly used leaf spring system where spacers are used between springs to avoid "fretting." Further, spring costs are usually high since many thin springs are required to give a superior system rather than a few heavy springs. Also, to obtain long spring life, rust proofing, heat treatment, shot peening, rolled edge stock, and other treatment must be resorted to. Unit assembly costs on multiple leaf spring types are high since a multiplicity of springs, spacers, clamps, and other components must be assembled to complete the unit. In the disclosed system, two simple disk shaped members replace a multiplicity of leaf spring members. In one specific case, two disk spring members replace thirteen leaf springs and thirty spacers.

It is highly desirable to totally enclose the spring and exciter elements in a vibratory system to prevent contamination of these elements by foreign matter. Further, it is desirable and often necessary that the vibratory unit be designed to prevent accumulation of foreign matter between is vibrating elements. Such contamination or accumulation when present will greatly reduce the life of elements and prevent continued delivery of optimum performance of the unit. The enclosure of the elements in conventional systems, particularly leaf spring systems, is both complicated and costly and is usually accompanied by a considerable basic sacrifice of performance. Essentially, in conventional systems, the spring members only support the mass to be vibrated and provide energy storage means. In the spring system herein disclosed, the system shown not only accomplishes the above functions but also acts as a simple enclosing means for itself, the exciter elements, and other elements. Total enclosure of the unit is accomplished simply and effectively without performance reducing additions or compromises.

A major cause of reduced spring life and system performance in leaf spring systems which are most commonly used in vibratory equipment is the contamination of foreign mater between leaves of the springs. Exclusion of such possible contamination is both difficult and costly and virtually any means used on conventional type systems reduces the optimum performance of the units. Usually, enclosure is accomplished by rubber "boots," entombment of the spring elements in a filler material, or covering the elements with a "bellows." In the disclosed system, the spring elements are inherently enclosed even if a multiplicity of disk elements is used. This exclusion of foreign matter is easily accomplished because of the fact that the clamping regions of the disk are at the points at which foreign matter must make its entry to the spring system.

Another major cause of spring failure is edge defects in leaf spring systems since nicks, burrs, and other damaged areas in the edges produce high local stresses at these defective points when the spring is deflected. The disclosed system does not have any edges which are under load during deflection. Hence, minor defects in the edges do not affect spring life. In short, the disclosed system provides the maximum spring force in the smallest possible space, particularly, in one plane, and further provides an inherently closed system.

Basic laws of dynamics require that in any action-reaction system, the forces which are produced must act on the center of gravity of the affected masses in order to avoid rotational couples. In systems utilizing conventional spring means, resolution of these forces and the proper application to the mass are highly complex and not readily apparent. In the disclosed system, the masses tend to be symmetrical bodies and since the spring element is a symmetrical element, the exciting force and inertia forces all act along the symmetrical axis of the device and no rotational couples are produced.

In vibratory feeders and conveyors of the type disclosed herein, a condition called front end flip exists which is commonly found in vibratory type conveyors. Front end flip is defined as the ratio of vertical movement of the front end of the tray to the vertical movement of the rear end of the tray. This condition can be desirable or undesirable, depending upon the application of the feeder. For example, in the feeding of light fragile material, front end flip must be avoided while in the case of "face feeding" of a magnetic pulley or separation of ferrous material from non-ferrous material, a higher degree of front end flip is desirable. In conventional vibratory machines, the front end flip is inherent in the basic design of the machine due to the non-symmetry of the components and cannot readily be changed. In the machine disclosed in this application, the front end flip can be changed by several simple means.

First, it has been discovered that the front end flip can be changed by adding or removing weight from the reactive element or reactive mass of the machine so that the center of gravity of the moving mass and the center of gravity of the reactive mass are on a line parallel to the line of translation and the nearer the center of gravity of the machine, the less front end flip will be apparent.

In order to increase front end flip, the center of gravity of the moving mass must be moved with relation to the line of translation to a position as far from the line of translation of the reactive mass as possible. This will produce a rotational force couple which will cause rotation of the entire unit on the resilient mounts which isolate the reaction mass from the support. This will produce a front end flip condition.

The spring and exciter systems disclosed can readily be contained as a single unit element for application wherever vibratory motion is required. The elements in their normal configuration provide a compact, sealed, self-contained unit which is readily adaptable to any type of application without the requirement or consideration of each application as a complicated dynamic force system.

It is, accordingly, an object of this invention to provide an improved vibratory device and, also, a vibratory device in combination with a machine for feeding material wherein the device is simple in construction, economical to manufacture, and simple and efficient in operation.

Another object of the invention is to provide a vibratory apparatus for use on conveyors wherein the device itself provides the requisite damping due to the inherent design of the device.

Still another object of this invention is to provide a vibratory conveyor which can be operated at or near the natural frequency of vibration of the device itself without inherent instability.

A further object of the invention is to provide an improved support for a vibratory conveyor.

A still further object of the invention is to provide an improved spring for use in supporting a vibratory conveyor.

Still a further object of the invention is to provide an improved supporting device for a vibratory conveyor wherein the location of the mounting of the device on its base inherently corrects undesirable forces and also makes it possible to deliberately introduce forces without upsetting equilibrium.

Yet another object of the invention is to provide an improved tuning device for a vibratory conveyor.

Yet a further object of this invention is to provide an improved support for a conveyor and a conveyor in combination with the same.

Still yet another object of this invention is to provide an improved spring and support for a vibratory conveyor wherein the spring is enclosed within the support.

Still yet a further object of this invention is to provide a vibratory and spring support therefor wherein the spring is not subject to failure because of injuries to the edges of the spring itself.

It is another object of this invention to provide a vibratory motor and conveyor supported on disk shaped springs.

It is still another object of this invention to provide several means for controlling a condition called front end flip which is commonly found in vibratory feeders.

It is still a further object of this invention to provide a means for controlling front end flip conditions in a vibratory feeder without basic alterations in the design of the feeder.

It is yet another object of the invention to provide an enclosed vibratory motor wherein the vibratory movement of the springs is damped by a fluid disposed in contact with the springs.

Further, an object of the invention is to provide a resilient support for a vibratory machine wherein the maximum springing function is accomplished in the minimum space.

It is a further object of this invention to provide a vibratory motor wherein the front end flip of the device can be regulated by controlling the angle of attachment of spring supports.

It is still yet another object of this invention to provide a vibratory machine wherein the effective front end flip can be controlled by varying the weight distribution of the elements of the machine.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
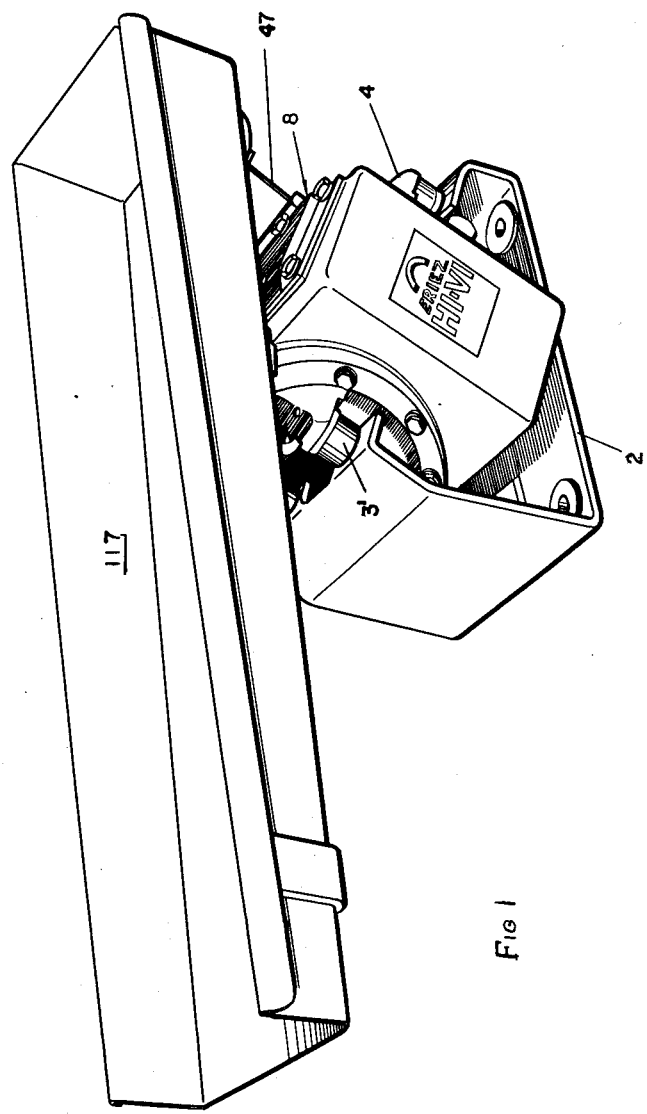
FIG. 1 is an isometric view of a conveyor according to the invention.

Now with more specific reference to the drawings, a conveyor or bulk feeder 1 is shown having a base 2 with holes 30 therein suitable for receiving bolts to clamp the base 2 to a supporting base.

The base 2 is made of a metal plate having a generally U-shape and having an intermediate portion 34 with upwardly extending legs 35 and 36. The leg 35 is bent inwardly at 37 to form a supporting portion 38a to which flexible rubber sandwich mountings 3' are attached by means of a stud 38 and a nut 39 with a suitable lock washer 40 thereunder.

A front spring clamp 5 has a rearwardly extending circular disklike plate integral therewith having the center portion thereof open at 43. The disklike plate has a flat surface 44 adjacent to the peripheral edge thereof against which a disk spring 6 is disposed and held in clamped relation between the surface 44 of the clamp 5 and a flat surface 45 of a body casting 7. The body casting 7 may be made of any suitable hollow shape with two flat end surfaces 45 and 45' but, as shown in the drawings, is generally of a square integral box type construction. An electrical assembly 8 may be inserted through an opening 9 in the upper part of the body casting 7 and held to the body casting 7 by means of studs 10 which extend through holes in the plate of the electrical assembly 8 and threadably engage suitable holes in the body casting 7.

A rear spring clamp 11 is attached to the body 7. The body casting 7 may be made either of magnetic or non-magnetic material such as iron or aluminum. Suitable bolts or other suitable clamping means hold a spring 13 rigidly clamped between the rear spring clamp 11 and the body 7. An armature assembly 116 is rigidly clamped to the central parts of the disk springs 6 and 13 at 60 and 61, respectively.

The rear central portion of the spring clamp 11 is counterbored between the peripheral edges thereof at 15' to allow the spring 13 to flex therein and a stud 16 is received in a bore 15 so that the spring 13 can flex freely. A rearwardly extending end 4 of the spring clamp 11 is supported on the mounting 3' at 42 and the stud 38 is attached to the rubber mount 3' and locked to the leg 36 by the nut 39 and the lock washer 40. The spaced bore 15 may be filled with a suitable fluid, either a compressible liquid or a gas. When the disk springs 13 vibrate, the action of the fluid will damp the vibration of the movable mass made up of springs, armature, and elements attached thereto. The armature assembly 116 is preferably made of non-magnetic material such as aluminum and is rigidly attached to a tie bar 18 by bolts 23. The tie bar 18 is rigidly attached to a tray assembly 117 by means of bolts 19.

The ends of the tie bar 18 are bent toward each other forming end portions 21 and 22. The end portions 21 and 22 are suitably bored and the end portion 21 receives the bolt 23 which has a head 24 thereon and, with a suitable lock washer 25, clamps the end portion 21 rigidly to a threaded end 26 of the armature assembly 116. A similar bolt 27 having the stud 16 thereon with a washer 17 and a lock washer 18 threadably engages an end 28 of the armature assembly 116 at 170 to lock the intermediate portion of the spring 13 thereto. Therefore, the armature assembly 116 is rigidly attached to the end 21 of the tie bar 18 with the central portion of the disk spring 6 rigidly clamped between the end portion 21 of the tie bar 18 and the end 26 of the armature assembly 116. The other end 28 of the armature assembly 116 is rigidly clamped to the central portion of the spring 13.

A permanent magnet 29 which is U-shaped in the example given is rigidly supported in the armature assembly 116 and pole pieces 46 which are made of magnetic material are attached to the ends of the U-shaped magnet 29. The magnet 29 is supported in a cleft 129 in the armature assembly 116 by a filler material 130. It is understood that a fixed polarity magnet such as a D.C. excited magnet could be substituted for the permanent magnet referred to.

The end 22 of the tie bar 18 is supported on rear tray support spring 47. The upper end of the spring 47 is attached to the end 22 of the tie bar 18 by means of a bolt 48 and the lower end thereof is attached to the body casting 7 by means of bolts 49.

The electrical assembly 8 is made up of a frame plate 50 having an E-shaped core 51 made of magnetic material supported thereon. The E-shaped core 51 has two outer legs 52 and 53 and an intermediate leg 55 with a coil 54 wound thereon in the usual winding manner. The pole pieces 46 on the permanent magnet 29 extend into the spaces between the legs 52, 53, and 55 of the core 51.

The permanent magnets 29 have a fixed polarity which may be N and S as indicated. These poles repel and/or attract, as the case may be, the poles of the electromagnet made up of the core 51 and coil 54 which may have its poles as indicated at a given half cycle; that is N (North), S (South), and N' (North'). Therefore, on a particular half cycle, the N pole of the permanent magnet 29 will repel the N pole of the electromagnet and, at the same time, attract the S poles of the electromagnet while the S pole of the permanent magnet 29 will repel the S pole of the electromagnet and attract the N pole of the electromagnet. Therefore, since the tray 117 is rigidly supported on the centers of the disk springs 6 and 13 by the bar 18 and the permanent magnet 29 is rigidly attached thereto and since the electrical assembly 8 is suspended on the outer peripheral edges of the disk springs 6 and 13 and resiliently supported on the base 2 by the rubber mounts 3 and 3', upon one-half cycle of A.C. current exciting the coil 54, the polarity of the electromagnet will be as indicated and the tray and permanent magnet assembly will be urged toward the rear of the machine; that is, toward the right. On the next half cycle, the polarity of the electromagnet will be reversed and the tray 117 will be urged forward or to the left. The oscillating action of the magnets, being along the line through the centers of the disk springs 6 and 13, will urge the materials lying in the rear part of the tray 117 to be advanced along the tray 117 toward the left.

Because of the natural damping tendency of the disk spring, the machine can be built so that the natural frequency of the movable parts of the machine are about equal to the electrical frequency which is usually sixty cycles in the United States. Therefore, since the machine can be operated at or near its natural frequency, the power input to the machine and the efficiency of conveying thereof can be enhanced. It has been discovered that disk shaped springs have many characteristics which especially lend themselves to application in a conveyor such as disclosed herein.

Figure 2:
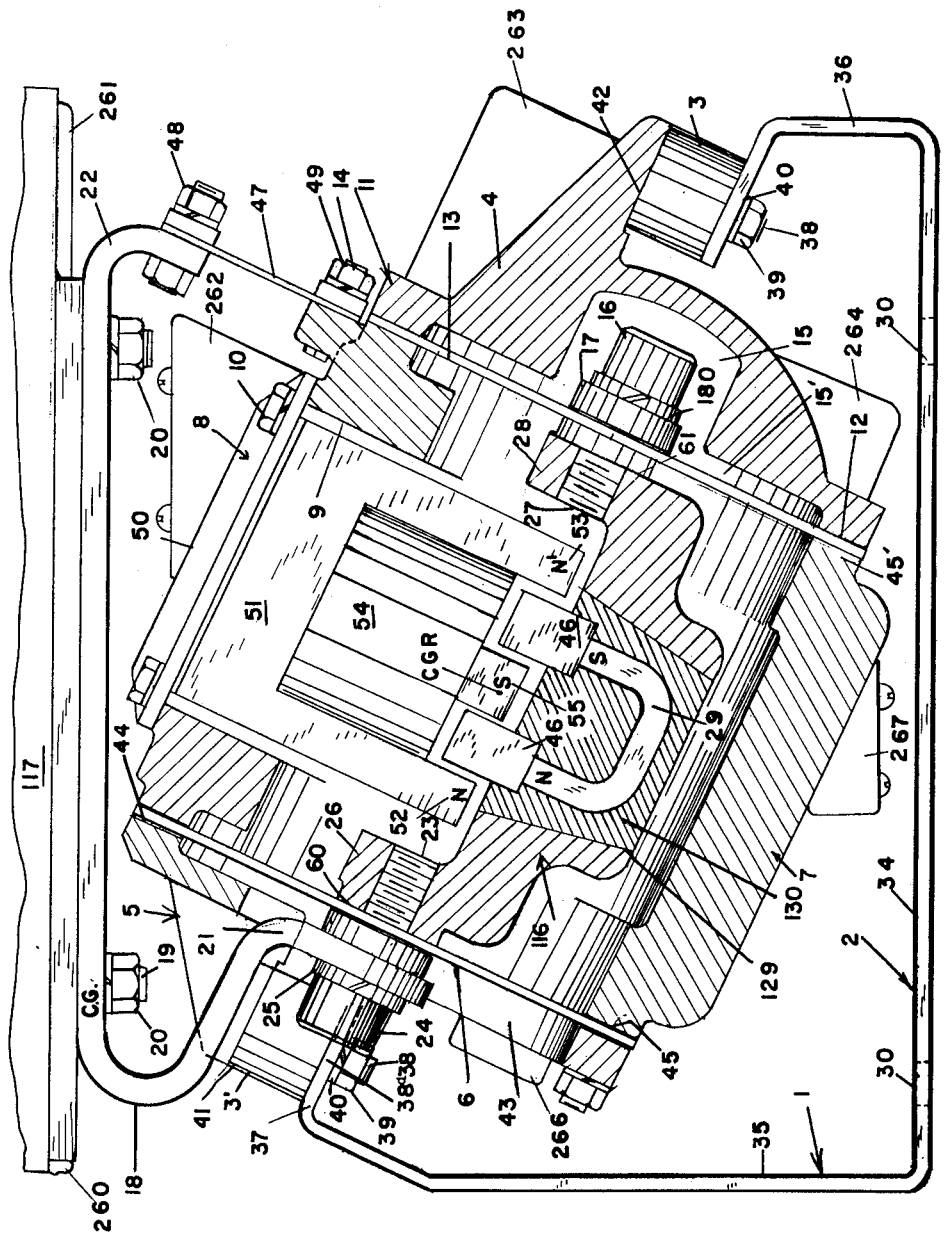
FIG. 2 is a view partially in cross section of a conveying device according to the invention.
Figure 6:
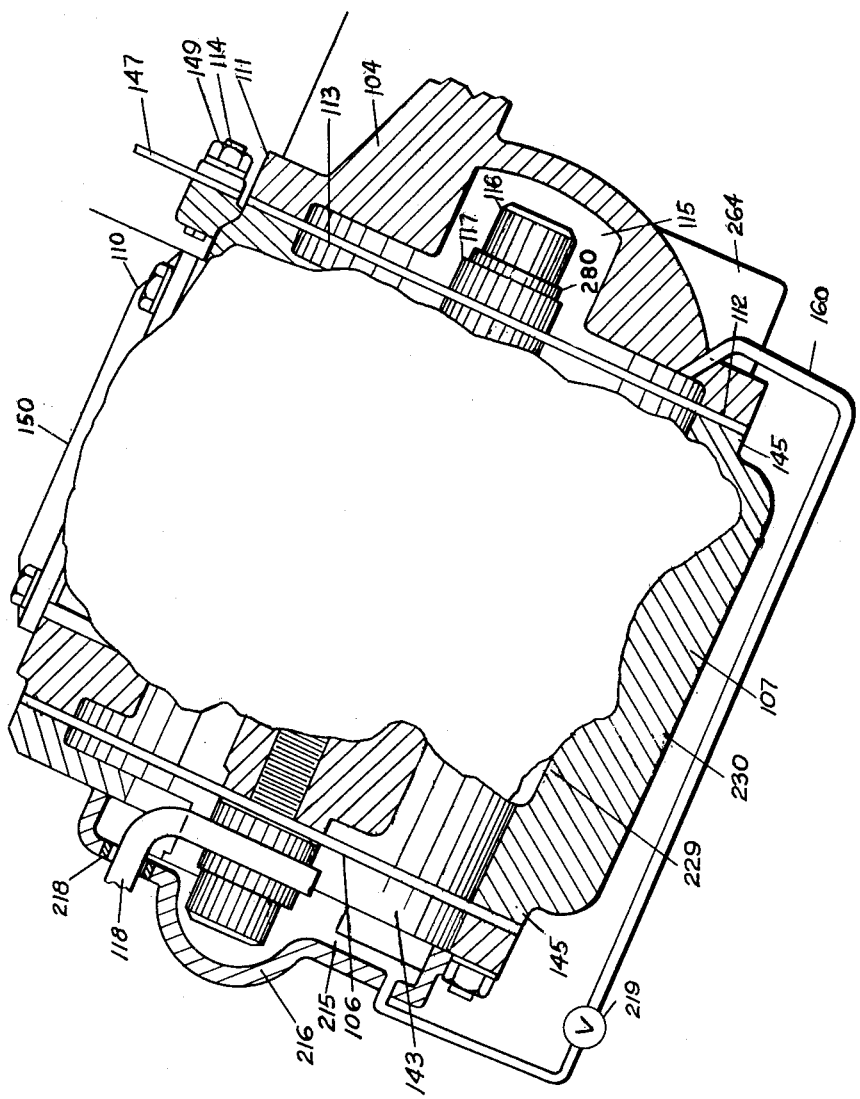

In the embodiment of the invention shown in FIG. 6, corresponding parts to those shown in FIGS. 1 and 2 are shown by the same index numerals having one hundred added thereto. In FIG. 6, a vibratory motor is shown having similar spring supports to those shown in FIGS. 1 and 2 but with liquid sealed in a bore 115 and with a pipe 160 connecting to a sealed space 215 between an end 216 and a spring 106. A support 118 extends through a gland 218 in the end 216 and slides therein as the armature vibrates. A valve 219 may be either a throttling valve, a flow control valve, or other valve to give proper characteristics. The valve 219 is connected in the pipe 160 and it can be adjusted to throttle the flow of fluid through the pipe 160, thereby controlling the damping effect thereof.

In the machine comprising the present invention, mass distribution to provide for a specific result desired can be readily added to the areas shown in FIG. 2 in manufacture or at the place of use of the machine. By locating the springs of the machine in such a manner that their instant centers may be located from some definite point to infinity, if the springs are disposed in planes which are at an angle to one another (not parallel), the mechanics of motion require that they pivot about an instant center described by an intersection of lines drawn through and parallel to their respective axes. In the invention disclosed herein, the instant center may be varied from a specific desired point to infinity by simple machining of the feeder elements to produce a specific angle or parallelism between the spring planes. When the spring planes are parallel, front end flip is at a minimum. If the spring planes are not parallel, the angle chosen between the springs will determine the degree of front end flip.

In the first method (C.G. of moving mass not on a line parallel to the line of translation with C.G. of the reactive mass), when the springs of the unit are parallel to each other, the moving mass and the reactive mass must move relative to one another in a manner which is parallel to the line of translation. If, however, the C.G. of the moving mass does not lie on the same parallel line to the line of translation as the C.G. of the reactive mass, a rotational couple will be introduced which will cause rotation of the entire unit on the shock mounts. This can be shown graphically if moments are summed about point 1, for instance.

$M^1$ equals 0 $F^1$ (distance from point 1 equals 0) $+F^2$ ($X$) equals 0. In order for the summation of moments to be equal, it is obvious that distance X must be 0 and the C.G. of both masses must be on the same parallel line to the line of translation.

Figure 5:
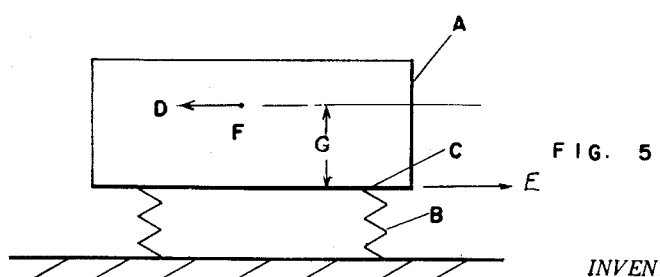

A second method for controlling front end flip in the machine disclosed herein is by varying the stiffness and/or position of the vibration isolation mounts. Essentially, the purpose of the isolation mounts is to provide a "free floating" condition for the vibratory unit. Thus, normally, there is no force exerted on the base by the restriction of the motion of the base by the isolation mounts. If, however, the mounts are selected with a stiffness which is not necessarily ideal for isolation purposes, they introduce a restrictive force; for example, E exerted by mounts B on base A at point C. As shown in FIG. 5, this force is opposed to the inertia force D which acts at F, the C.G. of the base A, and introduces a rotational couple and, hence, a front end flip condition to the unit as a whole. Front end flip controllability is limited by this means since deivation from ideal base isolation conditions cannot be compromised beyond reasonable limitations.

The magnitude of the couple producing front end flip and, hence, the degree of front end flip will also be a function of the perpendicular distance G between the C.G. F of the unit and the point C at which the restrictive force of the mounts B is produced. Thus, by varying the position of the mounts B relative to the point F, the front end flip may be controlled to a desired degree.

In the machine disclosed herein, the position of the mounts B may readily be changed during the manufacturing operation after the machine is ready for service since the design may provide for an adjustable mounting clamp as shown in FIG. 5. If the springs are at an angle to one another, the mechanics of motion require that they pivot about an instant center described above as an intersection of lines drawn through and parallel to their respective axes.

Figure 3:
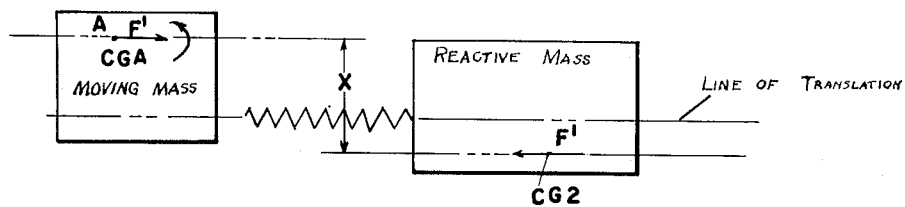
FIGS. 3, 4, 5, and 6 are views of alternative embodiments of the invention.

The characteristics of the machine can be changed by varying the stiffness and position of the shock mounts. Normally, the shock mounts have the proper stiffness perpendicular to the line of loading from the base to render the unit free floating when in operation; that is, there will be no force exerted on the base to restrict its motion. By adjusting the stiffness of the shock mounts so that they are no longer tuned to the mass and movement of the base, however, a reactive force can be introduced to the feeder at point B which, by opposing the inertia forces applied to the rough point A (FIG. 3), will introduce a couple. The magnitude of this couple will depend upon the reactive force at point 2 and the distance between point 2 and the C.G. of the base.

Figure 4:
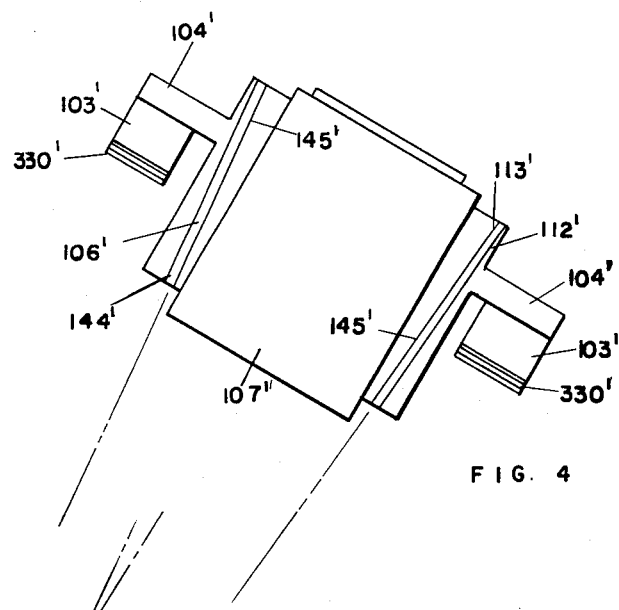

FIG. 4 shows the manner in which the spring support can be changed to vary the front end flip in accordance with the second method; that is, resilient mounts 103' are supported on end supports 104' which are attached to a body casting 107'. Ends 145' and 113' of the body casting 107' incline with planes on their surfaces 112' converging with a plane passing through the end 145'.

The end 113' is clamped between the surfaces 112' and 145' and disk springs 106' are clamped between the surfaces 145'. The tray will be supported on the disk springs and magnetic armatures and solenoids will be provided as in the embodiment of the invention shown in FIGS. 1 and 2. Therefor, as explained supra, the front end flip of the machine can be controlled by controlling the angular relationship of the planes passing through the members 106' and 113. The front end flip can also be controlled by adding or removing shims 330' to regulate the effective length of the mounts 103'.

FIG. 2 shows weights 260 and 261 which can be added to the tray 117 and weights 262, 263, 264, 267, and 266 which can be added to the reactive mass. It will be obvious that adding the weights 260 and 261 will shift the C.G. of the tray 117 downwardly and in a direction toward the added weights. The adidtion of the weights 262, 263, 264, 267, and 266 will shift the C.G. of the reactive mass made up of the base casting and parts connected thereto in the direction of the added weights. This will control the mass in accordance with the first method outlined above.

Another method for controlling the distance between the C.G. and, therefore, the front end flip is to control the resiliency of the material of the mounts 3 and 3'. To further control this function, the shims 330' as shown in FIG. 4 may be added between the resilient mounts 3 and 3' and the leg 36. This will increase the distance between the base and the reactive mass and, therefore, regulate the front end flip in accordance therewith.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A vibratory motor comprising two spaced disk shaped springs each having flat sides made of a continuous sheet of material and disposed in generally parallel planes, an armature support between said springs, means rigidly fixing the center of each said spring to said armature support, a hollow body having said armature support therein, the outer peripheral edges of said disk springs being rigidly clamped to spaced ends of said hollow body, support means for said hollow body, a first magnet on said armature support, and a second magnet on said body, the poles of said first magnet being adjacent the poles of said second magnet, one of said magnets being an electromagnet.

2. The motor recited in claim 1 wherein said armature support has means thereon for supporting a member to be vibrated.

3. The motor recited in claim 2 wherein said means for supporting said member to be vibrated comprises a rigid member fixing one part of said member to be vibrated thereto and a resilient member supporting a part of said member to be vibrated at a point spaced from said rigid member.

4. The motor recited in claim 2 wherein said support means for said hollow body comprises two spaced blocks of resilient material, each attached to said body at a position spaced from the other and each attached to a rigid support member.

5. The motor recited in claim 4 wherein means is provided to define a chamber around the surface of said springs remote from said hollow body, said chamber containing fluid in engagement with said springs to increase the damping effect thereof.

6. In combination, a vibratory feeder trough and said motor recited in claim 1, and means supporting one end of said trough on said armature support and means supporting one end thereof on said body.

7. The combination recited in claim 6 wherein one said support means for said trough is attached to said armature support adjacent one said spring and the other said support means for said trough is attached to said hollow body adjacent the other said disk shaped spring, said trough being disposed over said body.

8. The motor recited in claim 1 in combination with a conveyor, said conveyor attached to said armature support and a base attached to said body.

9. The motor recited in claim 8 wherein said second magnet has a core terminating in three spaced aligned legs and said first magnet is a U-shaped permanent magnet having its legs disposed between said legs of said second magnet.

10. The vibratory motor recited in claim 9 wherein said first magnet is supported in a cavity in said armature support by means of a filler material.

References Cited in the file of this patent

UNITED STATES PATENTS

| | | |
|---|---|---|
| 2,204,379 | Overstrom | June 11, 1940 |
| 2,332,600 | Rapp | Oct. 26, 1943 |
| 2,387,223 | Carson | Oct. 16, 1945 |
| 2,407,357 | Weyant | Sept. 10, 1946 |
| 2,417,715 | Stewart | Mar. 18, 1947 |
| 2,444,134 | Hittson | June 29, 1948 |
| 2,554,538 | Murphy | May 29, 1951 |
| 2,634,123 | Ralston | Apr. 7, 1953 |
| 2,654,256 | McKechnie | Oct. 6, 1953 |
| 2,790,097 | Hopkins | Apr. 23, 1957 |
| 2,854,130 | Adams | Sept. 30, 1958 |